March 5, 1940.　　　H. E. BEISSNER　　　2,192,784
EDUCATIONAL DEVICE
Filed Nov. 17, 1937　　　6 Sheets-Sheet 1

Inventor
H. E. Beissner.
By Lacey & Lacey,
Attorneys

March 5, 1940.  H. E. BEISSNER  2,192,784
EDUCATIONAL DEVICE
Filed Nov. 17, 1937  6 Sheets-Sheet 2

Inventor
H. E. Beissner.
By Lacey & Lacey,
Attorneys

March 5, 1940.    H. E. BEISSNER    2,192,784
EDUCATIONAL DEVICE
Filed Nov. 17, 1937    6 Sheets-Sheet 4

Inventor
H. E. Beissner.
By Lacey & Lacey, Attorneys

March 5, 1940.  H. E. BEISSNER  2,192,784
EDUCATIONAL DEVICE
Filed Nov. 17, 1937   6 Sheets-Sheet 5

Inventor
H. E. Beissner.
By Lacey & Lacey,
Attorneys

March 5, 1940. H. E. BEISSNER 2,192,784
EDUCATIONAL DEVICE
Filed Nov. 17, 1937 6 Sheets-Sheet 6

Inventor
H. E. Beissner.
By Lacey & Lacey,
Attorneys

Patented Mar. 5, 1940

2,192,784

UNITED STATES PATENT OFFICE 2,192,784

EDUCATIONAL DEVICE

Henry E. Beissner, San Antonio, Tex.

Application November 17, 1937, Serial No. 175,166

8 Claims. (Cl. 35—24)

This invention relates to an educational device and more particularly to a device intended for use by insurance agents and others whose business consists of selling investments.

One object of the invention is to provide a device of this character which consists of a container and a plurality of cards having data thereon which will be displayed through openings in the container and thus permit the insurance agent or bond salesman to selectively place a card in position to permit desired data to be seen through openings in the container and inspected by a prospective purchaser. It will thus be seen that the salesman or agent will be relieved of a great deal of sales talk and the answering of numerous questions by the prospective purchaser and also that the purchaser himself may inspect the data appearing through the sight openings in the container.

It is another object of the invention to provide a device of this character consisting of a container and a number of cards capable of being placed in the container when not in use and the container with the cards therein carried in a pocket or brief case. It will thus be seen that a compact device has been provided and that, when it is desired to discuss insurance, bonds or the like with a prospective purchaser, it is merely necessary to select an appropriate card in the container and place it next to a side wall thereof so that data will be displayed through openings in the side wall.

Another object of the invention is to provide the container with such an arrangement of openings in its side wall that, when a certain card is withdrawn from the container for use, it can only be placed in a certain position for display of its data through companion openings in a side wall of the container. It will thus be seen that there will be no danger of a prospective purchaser obtaining a wrong impression of the proposed transaction.

Another object of the invention is to provide the device with a band carrying a pointer and serving not only as means for securing the container with the cards therein when placed in a pocket or brief case but also serving as means shiftable along the container to bring the pointer into operative relation to data showing through the sight openings. It will thus be seen that by properly placing the band and the pointer particular attention may be called to certain data.

The invention is illustrated in the accompanying drawings, wherein:

Figure 2 is a view of the cover with the band removed, Figure 2ª is a view showing the container removed from the cover and the band applied about the container.

Figure 1:
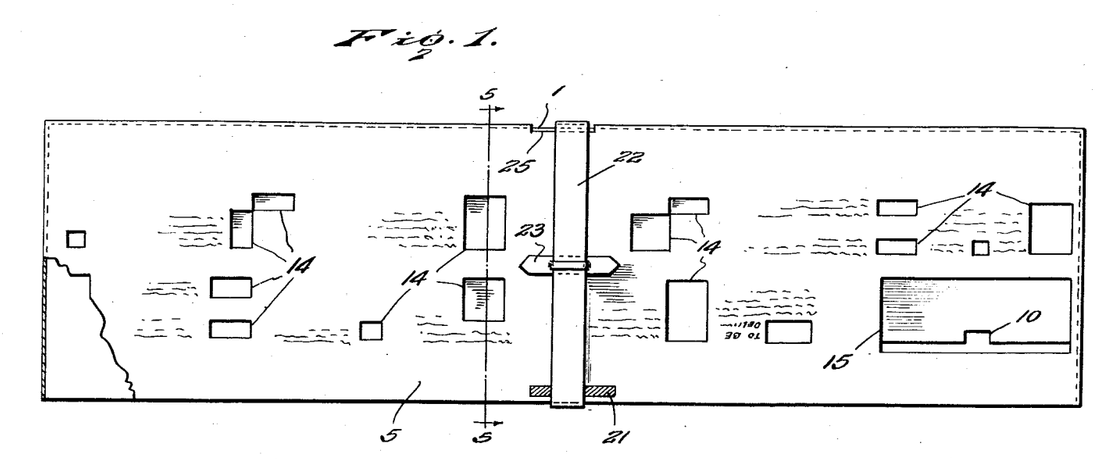
Figure 1 is a view in elevation of the container with its cover in place and secured by a band encircling the same and carrying a pointer.
Figures 2A, 2B:
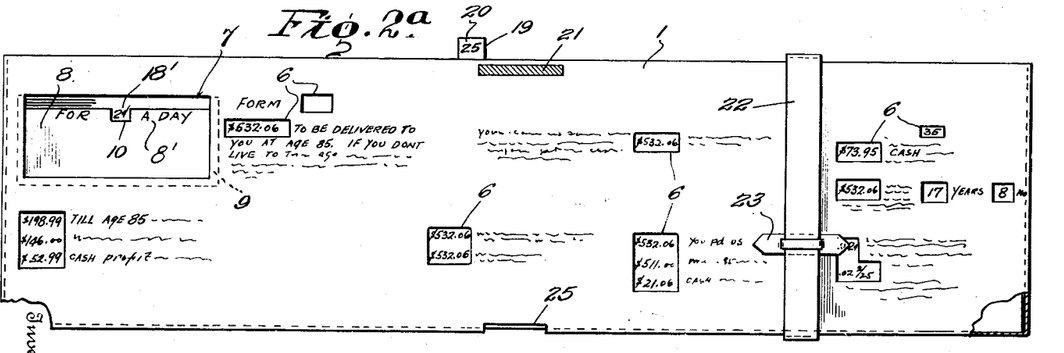
Figure 3:
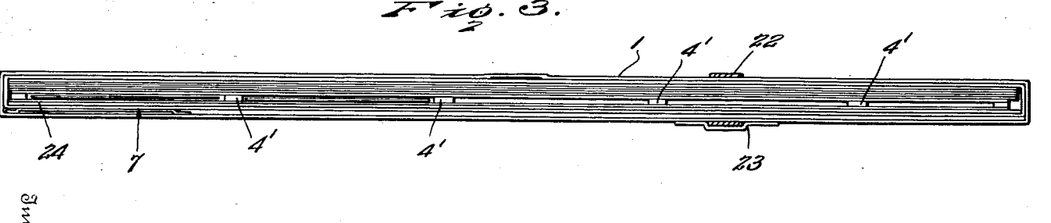
Figure 3 is a view looking at the container with the cover removed and the band shown in section.
Figure 4:
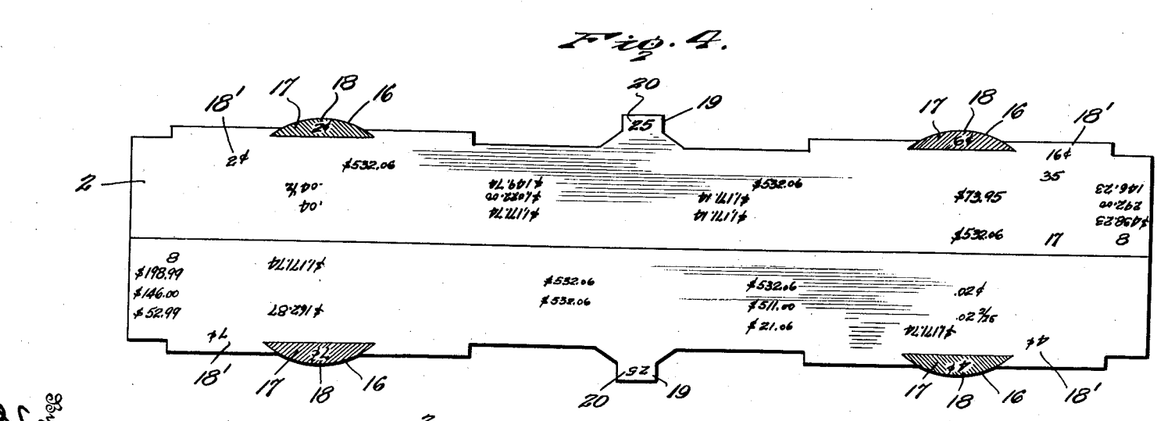
Figure 4 is a view of one of the cards.
Figure 5:
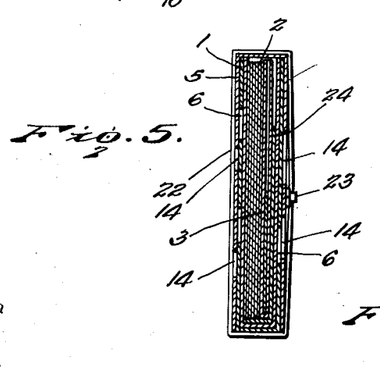
Figure 5 is a sectional view taken along the line 5—5 of Figure 1.
Figure 6:
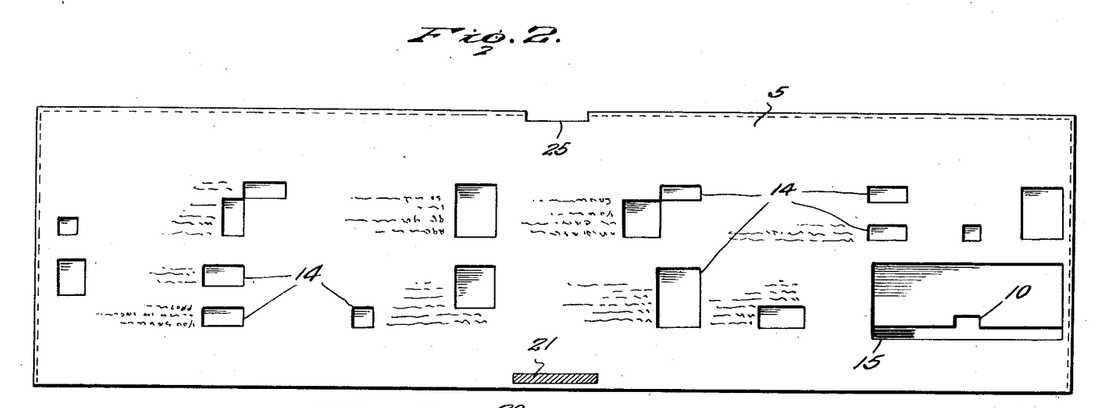
Figure 6 is a view of a holder for a set of small cards forming part of the device with a portion of the holder broken away.
Figures 7, 8:
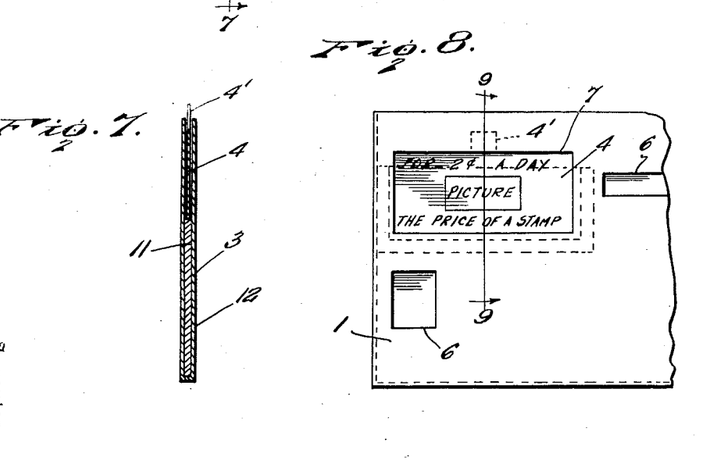
Figure 7 is a sectional view taken along the line 7—7 of Figure 6.
Figure 8 is a view showing one of the small cards of Figure 6 in a pocket of the container.
Figure 9:
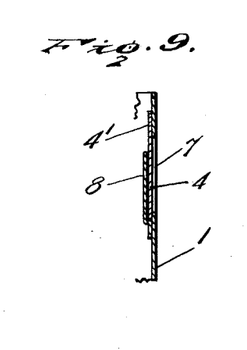
Figure 9 is a sectional view taken along the line 9—9 of Figure 8 and illustrating the manner in which the card is held in the pocket.
Figure 10:
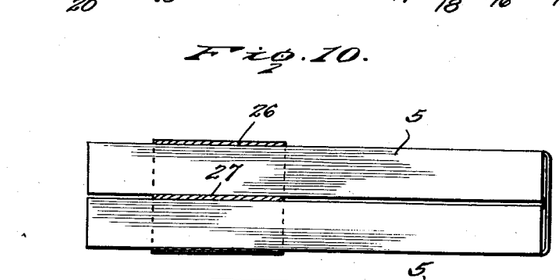
Figure 10 is a view in elevation showing the manner in which the device may be folded when not in use and thus take up a small amount of space in a pocket or brief case.
Figure 11:
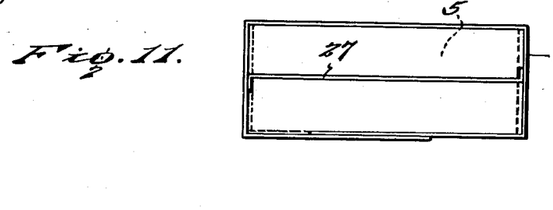
Figure 11 is a view of the band used for holding the device in the folded condition shown in Figure 10.

The container 1 of this device consists of an envelope which is open along its upper edge in order that a number of cards 2, such as shown in Figure 4, and a holder 3 for a plurality of small cards 4 illustrated in Figure 6 may be placed in the container. The container and the cover 5 which fits over the same are formed of paper as are also the cards, and while this paper from which they are formed will be of sufficient toughness to prevent them from being easily torn and also permit the cards to be easily withdrawn and replaced in the container, it is desired that they be of sufficient flexibility to permit the container with the cards therein and the cover in place to be folded and secured in the folded condition, as shown in Figures 10 and 11. In case it is not desired to provide a device which may be folded when placed in a pocket or brief case, the cards may be formed of stiffer paper or thin cardboard. Each side wall of the container is formed with openings 6 which are distributed about the same in a predetermined arrangement and each wall of the container is also formed in a corner portion with a pocket 7 formed by cutting the wall of the container to provide a tongue 8 which is creased along its lower edge and pressed inwardly and pasted against a backing strip 9 having extended marginal portions which are pasted against the inner face of the side wall of the container. A notch 10 is formed midway the length of the upper edge of the rearwardly projected tongue or strip so that data upon a card may be seen through this notch when the small cards shown in Figure 6 are not in use. When the small cards are in use, a selected one will be withdrawn from the holder and placed in the pocket where it will be held in place by the backing strip. A legend 8' is printed upon the outer face of the tongue 8 and opposite sides of the notch 10 and has a definite relation to the portion of the data upon the card which is exposed through the notch 10. Each of the small cards also bears a legend corresponding to the information imparted by the printing upon the backing strip 9 and the data exposed through the notch 10. A small tongue or tab 4' extends upwardly from each of the small cards in order that it may be easily removed from the holder and inserted into the pocket 7 or removed from this pocket and restored to the holder. The holder is also formed of paper and consists of a main sheet 11 and a covering sheet 12 which is folded, as shown in Figure 7, and secured against opposite side faces of the main sheet. Portions of the main sheet are cut out to provide recesses 13 of the proper size to receive the small cards, and referring to Figures 6 and 7, it will be seen that these pockets are of such depth that the tabs 4' of the small cards will project outwardly so that they may be easily grasped and the cards removed from the pockets. Openings 14, corresponding to the openings 6, are formed in each side wall of the cover 5, and this cover is also formed in a corner portion of each side wall with a pocket 15, corresponding to the pocket 7 and of the same construction. It will thus be seen that the cover as well as the container or envelope may be used as means for displaying the data upon the cards. Attention is further called to the fact that each of the cards is provided near its corners with lateral extensions 16 colored, as indicated at 17, in order that they may be readily distinguished from each other and upon these extensions are printed value marks 18 representing the amount to be saved and corresponding to the value marks 18' which are to be selectively displayed through the notch 10 of the container or cover when the card is inserted for use and indicate amounts to be saved each day an insurance policy is in force. A tab 19 extends from each side edge of the card intermediate the length thereof in order that it may be easily removed or inserted and each tab is marked, as shown at 20, with a number representing a person's age. In the present illustration, the age indicating number is "25" and a card so marked will be used when discussing insurance with a person of this age. Other cards will have their tabs 19 marked to indicate various ages and the tabs will be so located that, when they are stacked, the tabs will be in offset relation to each other. Therefore, a person can easily withdraw a desired card from a stack of cards and insert it in the container or cover so the printed matter cooperating with the selected valuation mark 18 will be displayed through openings in the container or cover. Markers 21 which are colored to correspond to the colors of the extensions 16 are provided upon the side walls of the container 1 and the cover 5, thus facilitating correct disposal of a card in position for use as it is merely necessary to note the color of the extension 16 bearing the selected value mark and then place the card in the container or the cover in such position that data printed upon the card and cooperating with the value mark upon the selected colored extension 16 will be displayed through the openings formed in the side wall of the container or cover upon which the correspondingly colored mark 21 is provided.

In order that the cover 5 may be held about the container 1, there has been provided a band 22 formed of transparent material and carrying a pointer 23 which is slidably mounted upon the transparent band. This band not only serves to secure the cover about the container but is also to be employed as means for calling attention to certain of the data visible through the openings of the container or cover. This is accomplished by disposing the band about the container or cover after a selected card is in place and then shifting the band along the same and moving the pointer into position to extend toward the data to which attention is to be called. Of course, the prospective purchaser or the salesman may shift the band or slide the pointer along the same until the pointer is directed towards disclosed data which should be particularly noted. When the device is to be kept flat at all times, a backing sheet 24 of cardboard is placed in the container and may be removed therefrom and transferred to the cover when necessary.

When the device is to be folded before being placed in a pocket or brief case, cut-outs 25 are formed in the container and the cover to permit the device to be very easily folded and instead of a single band, the double band 26 shown in Figures 10 and 11 will be used. This double band is of sufficient dimensions to engage about the folded device and is provided with a cross strip 27 serving to provide the band with individual portions through which ends of the folded container and cover will be passed, as clearly shown in Figure 10. When this band is removed and the container and cover unfolded and returned to its extended position, one section of the double band may be again applied about the device and slid along the same. This band may carry a pointer corresponding to the pointer 23 or the band 26 may be used in addition to the band 23 and the band 26 merely used for securing the device folded while the band 22 is slid along the device and the pointer shifted along the band into position to point towards various items displayed through the openings.

When this device is in use, cards having suitable data printed thereon are placed in the container or envelope 1 together with a backing card 24 and a folder 3 in which the small cards 4 are placed. The cards and the container and cover illustrated in the accompanying drawings bear data relating to insurance policies and the portions 16 of these cards have values marked thereon showing the amount which a policy holder would have to save each day in order to meet the terms of a selected policy. If a prospective purchaser of an insurance policy aged twenty-five devices that he could save a certain amount each day, which in the present instance will be assumed to be two cents a day, the insurance agent will grasp the tab 19 bearing the mark "25" and remove this card from the container and then replace it between the backing sheet 24 and the wall of the container having a mark 21 of the same color as the extension 16 upon which the amount two cents has been printed. The two cents printed upon the card at 18' will show through the opening 10 of the container wall and, if so desired, the agent may remove the small card 4 having "Two cents" printed upon its tab 4' and slip this small card into the pocket 7. The small card in use is printed with a suitable inscription designating a very cheap article which can be bought for two cents and emphasizing the small amount which the prospective purchaser would have to save. Other items printed upon the cards show through the openings and by reading the inscriptions printed upon the wall of the container near these various openings the prospective purchaser of an insurance policy can ascertain for himself the answers to numerous questions which an insurance agent is expected to answer. After the prospective purchaser has considered the data relating to a policy which will cost two cents a day, the card may be turned so that data relating to a policy which will cost four cents a day or any other desired amount may be disposed in position to be viewed through the openings of the container. In case a card is selected having a value greater than that of cards which are to be displayed through the openings of the container, this card will bear a color upon its extension 16 corresponding to color marks upon the cover and the card will be placed in the cover. When the cover is used for display purposes, it may be disposed about the container in such a position that the container will be left open and the card inserted between the container and a wall of the cover when in use. It will thus be seen that an insurance agent will be saved the trouble of answering a great many questions and in addition the prospective purchaser of a policy will have a printed form to look at while deciding the type of policy he desires.

Figures 12, 14:
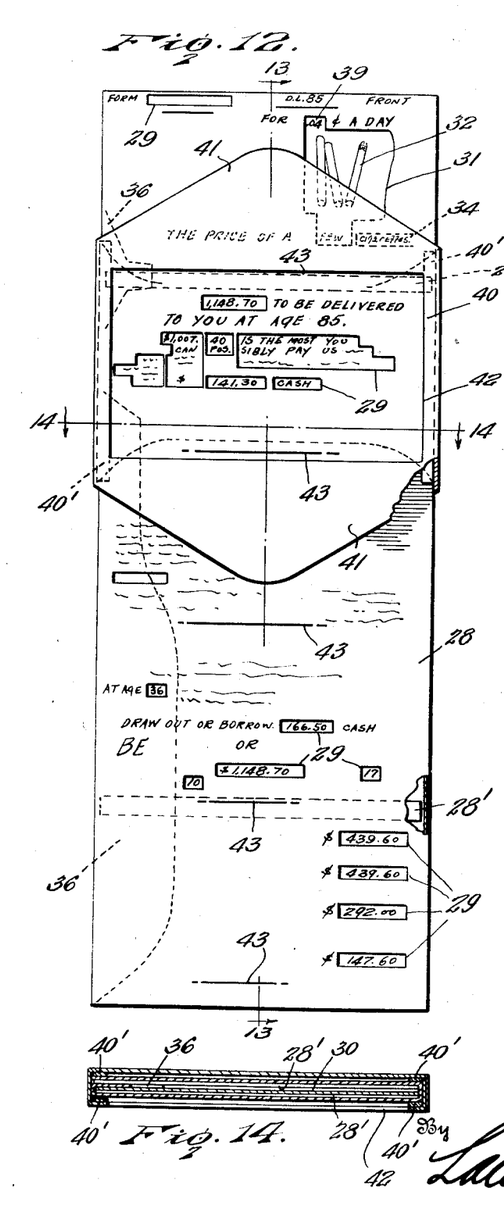
Figure 12 is a view in elevation of a modified form of the invention.
Figure 14 is a sectional view taken transversely through Figure 12 along the line 14—14.
Figure 13:
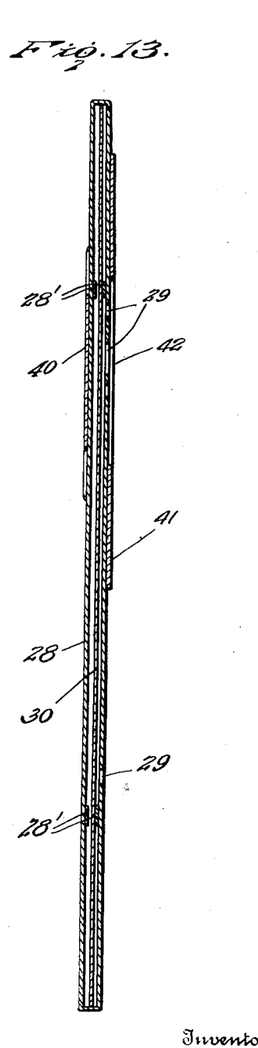
Figure 13 is a sectional view taken along the line 13—13 of Figure 12.

In Figures 12, 13 and 14, there has been illustrated a modified construction wherein the envelope 28 is formed with a suitable number of openings 29 corresponding to the openings 6 and 14 so that data printed upon the card 30 will be displayed through these openings when the card is fitted within the envelope. There has also been provided an opening 31 in a corner portion of the envelope for display of a few very cheap articles, such as the cigarettes 32, which are printed upon the card. The name of the article is also printed upon the card, for display through an opening 34 formed in the envelope near the opening 31. This will emphasize the fact that only a very small expenditure will be required by the prospective purchaser such as a person who is contemplating buying life insurance. A number of strips of paper 28' are pasted or otherwise secured against inner faces of walls of the envelope transversely thereof adjacent the openings to strengthen the envelope and define guides for permitting the card to be easily slid into the envelope. Age flaps 35 which correspond to the age flap 19 extend from opposite side edges of the card and are intended to be folded flat against the card when the card is inserted into the envelope and the closure flap or flaps 36 of the envelope tucked inwardly to hold the card in place. Each face of the card is printed with the data and when the card is thrust into the envelope with the selected age tab outermost data printed upon the card will be displayed through openings in each wall of the envelope. The data displayed through the openings are companion to information printed upon the outer faces of the walls of the envelope. While a representation of a cheap article will be printed upon each face of the card for display through the opening 31 of the envelope, such an opening will only be formed in one wall of the envelope. When the card is thrust into the envelope with the age tab 35 adjacent which the four cent mark 37 is located, the cigarettes or other cheap articles together with the cost mark 39 will be displayed through the opening 31, whereas, when the card is turned and fitted into the envelope with the tab 35 having the two cent mark 38 adjacent its base is disposed outermost, some other cheap article, such as stamps or the like, printed upon the other face of the card will be displayed through the opening 31. No matter which side of the card has a picture of a cheap article displayed through the opening 31, the proper data relating to the price mark will be displayed through the openings 29 of the two walls of the envelope and by looking at first one wall of the envelope and then the other wall and reading the printed matter upon the envelope and the data displayed through the opening the prospective purchaser can find the answers to practically all questions which are usually asked by a prospective purchaser. This will eliminate the necessity of the purchaser asking questions and also eliminate likelihood of an agent accidentally quoting incorrect values.

In order to concentrate the attention of the prospective purchaser upon groups of data printed upon the front or back of the envelope and the companion data displayed through the sight openings, there has been provided a band 40 which is preferably formed of paper although any desired material may be used. Reinforcing strips 40' are secured against inner faces of walls of the band to strengthen the band and permit the band to slide easily along the envelope. The band has its front wall formed with upper and lower tapered extensions 41 and between these extensions the front wall is cut out to form a sight opening 42 which is of such size that groups of data printed upon the walls of the envelope and set off from each other by dividing lines 43 may be individually displayed through the sight opening of the band. By sliding the band along the envelope the groups of data between the dividing lines may be individually and successively brought into position to be displayed through the sight opening of the band and, when one group of data is in position to be seen through the sight opening of the band, the upper and lower extensions of the band will serve to cover data above and below the particular group of data which it is desired to have the customer consider. Therefore, the prospective purchaser's attention will be concentrated upon the individual groups of data. After the data printed upon the front of the envelope have been inspected and carefully considered, the envelope will be withdrawn from the band and then turned and replaced through the band with the back of the envelope in position to have data printed thereon inspected through the sight opennig of the band.

Figures 15, 17, 18:
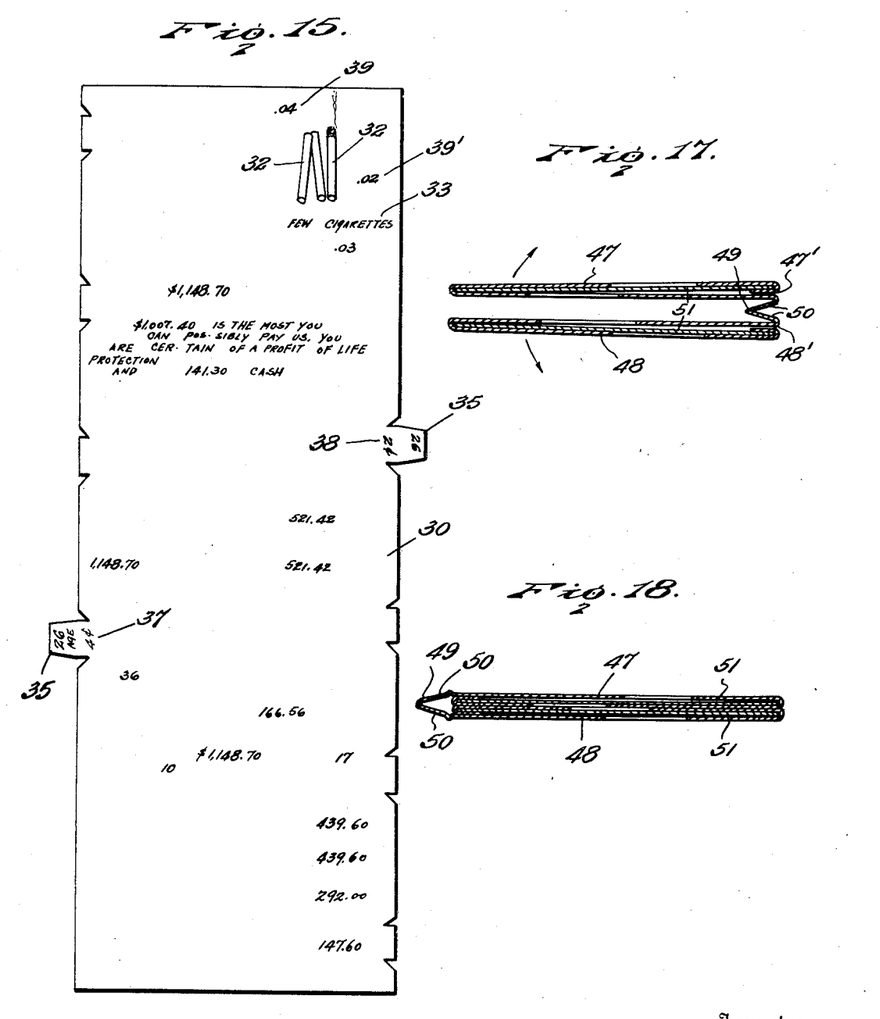
Figure 15 is a view of a card used in the envelope of Figure 12.
Figure 17 is a sectional view taken transversely through a double envelope and showing the same in one position of adjustment.
Figure 18 is a transverse sectional view showing the envelope of Figure 17 in another position of adjustment.
Figure 16:
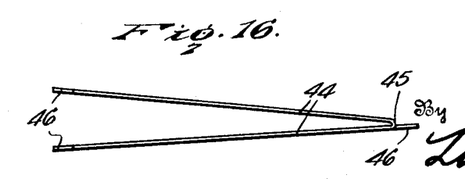
Figure 16 is a view looking down upon one end of a double card.

In Figure 16, there has been shown in top plan a modified form of card wherein a sheet of twice the width of the card shown in Figure 15 is printed upon both sides or faces with the data to be displayed through the sight openings of the front and rear walls of the envelope. This sheet of paper or cardboard is folded midway its width to provide the two leaves 44 which are integrally united along one edge, as shown at 45. The three side edges of the leaves are cut to form the tab 46 corresponding to the tab 35, and from one leaf there has been cut a tab 46 which projects from the united side edges of the leaves when the sheet is folded to form the two leaves. Data printed upon one face of a card 30 will be printed upon one leaf and data upon the other face of the card 30 will be printed upon the corresponding face of the second leaf. Therefore, when the sheet is folded to form the two leaves, the folded sheet may be placed in an envelope and the desired data will be displayed through the openings of the two walls of the envelope. By reversing the fold of the sheet data upon the other face of the sheet will be displayed through the sight openings of the envelope. It will thus be seen that this folded sheet will form a pair of leaves taking the place of two separate cards.

In Figures 17 and 18, there has been illustrated a modified form of envelope. In this embodiment of the envelope, there have been provided two sections 47 and 48 which may be referred to as companion envelopes or twin envelopes if so desired. These two envelopes are each open along one side, as shown at 47' and 48', and these open sides of the two envelopes are connected by a portion of the sheet of paper or other material from which the twin envelopes are formed. This connecting portion or web 49 is folded midway its width to provide the web with leaves 50 each of which is integrally united to the other and to a companion envelope. When an envelope of this construction is in use, a card of the single or double form may be placed in each envelope, as shown at 51, and by turning the envelopes to the position shown in Figure 17 wherein the leaves of the connecting web are disposed between the two envelopes data displayed through openings in certain of the walls of the envelopes may be read. By removing the band 40 from the twin envelopes and turning them to the position shown in Figure 18 with the web projecting from one side thereof, as shown in this figure, the band can then be replaced about the twin envelopes and data displayed through the openings in the other walls of the envelopes read. It will thus be seen that the walls of the two envelopes may be selectively brought into position for reading of the data displayed through the sight openings thereof. This arrangement will also permit the two envelopes to be disposed in side by side relation to each other and data relating to insurance policies of two different prices compared with each other or two cards both relating to an insurance policy of the same price fitted into the twin envelopes and successively referred to.

Having thus described the invention, what is claimed as new is:

1. In a device of the character described, a container having opposed walls each formed with sight openings in predetermined locations different from the openings in the opposed wall each bearing identification means and adjacent its openings having data upon its outer face, and a plurality of sheets of dimensions adapting them to be inserted within the container and each bearing identification means companion to the identification means of only one wall of the container and bearing data disposed in predetermined positions adapting them to be viewed only through the sight openings of the similarly identified wall when the sheet is placed within the container in confronting relation to the said wall.

2. In a device of the character described, a container, a removable cover for enclosing the container when applied thereto, the cover and the container each having opposed walls provided with sight openings distributed in predetermined locations and each bearing data adjacent its sight openings and an identifying mark for distinguishing it from the other walls of the container and the cover, and a plurality of sheets normally stored in said container and each having its opposed faces each bearing an identifying mark corresponding to the mark upon only one of the walls of the container or cover and also bearing data arranged in predetermined locations adapting them to be only viewed through sight openings of the corresponding identified wall.

3. In a device of the character described, a container having its walls formed with sight openings, a portion of each wall being formed with a pocket offset inwardly and open at its front and top, a plurality of cards adapted to be selectively fitted into the pockets of said walls, and bearing data exposed through the sight openings of the pockets when the cards are within the pockets and a holder for said cards removably received in said container and consisting of a main sheet formed with card receiving recesses and facings for opposite sides of the main sheet holding the cards in the recesses when inserted therein.

4. In a device of the character described, an open container, a removable cover fitting about the container in closing relation thereto, the cover and the container having their side walls formed with sight openings in predetermined locations, a plurality of sheets removably received in said container and each bearing data disposed in predetermined locations companion to the openings of only one wall of the container and cover and adapting them to be viewed through the sight openings of the companion wall of the container or cover when the sheet is disposed against the inner face of a wall of the container with a selected marginal edge of the sheet outermost, portions of edge walls of the container and the cover being cut out to permit folding of the device upon itself.

5. In a device of the character described, an envelope having its front and rear walls formed with sight openings and bearing data in cooperating relation to the openings, and a sheet folded to form interconnected leaves of dimensions adapting them to be received in said envelope, said leaves bearing upon their faces data disposed in position to be exposed and read through the openings of the envelope walls and companion to the data upon the envelope walls, said leaves having tongues extending laterally from their free side edges, and a tongue cut from the attached side edge portion of one leaf and extending laterally from the attached side edge of the other leaf in integral engagement therewith.

6. In a device of the character described, an envelope having a wall formed with sight openings and bearing data in cooperating relation to the sight openings, a sheet removably received in said envelope and bearing data disposed in position to be displayed through the sight openings and companion to the data upon the envelope, and a band removably engaged about the envelope transversely thereof and slidable along the same longitudinally thereof, said band being of a height adapting it to cover an appreciable area of the envelope and being formed with a cut out portion constituting a large display opening of dimensions adapting it to expose a portion of the envelope for substantially the full width thereof and disclose a selected group of sight openings and companion data on the envelope as the band is shifted along the envelope.

7. In a device of the character described, an envelope having a wall formed with sight openings and bearing data in cooperating relation to the sight openings, a sheet removably received in said envelope and bearing data disposed in position to be displayed through the sight openings and companion to the data upon the envelope, and a band engaged about said envelope and shiftable along the same, said band having a portion cut out to form a large display opening extending substantially the full width of the envelope and of dimensions adapting it to expose a large area of the envelope bearing a selected group of sight openings and companion data as the band is shifted along the envelope, portions of the band above and below the display opening being unperforated and extending upwardly and downwardly therefrom and tapered to provide flaps constituting shields for concealing portions of the envelope above and below the selected group of sight openings and companion data.

8. In a device of the character described, companion envelopes having walls formed with sight openings, and a web between the adjacent side edges of said envelopes, said web being creased along its junctions with the side edges of the envelopes to define fold lines, said web being folded longitudinally intermediate its width to define longitudinally united leaves whereby the envelopes may be swung from a position in face to face engagement, with certain of their walls outermost, to a reversed position with the above mentioned walls innermost.

HENRY E. BEISSNER.